United States Patent
Xiong et al.

(10) Patent No.: US 11,748,968 B2
(45) Date of Patent: Sep. 5, 2023

(54) TARGET TRACKING METHOD AND SYSTEM, READABLE STORAGE MEDIUM, AND MOBILE PLATFORM

(71) Applicant: SZ DJI TECHNOLOGY CO., LTD., Shenzhen (CN)

(72) Inventors: Feng Xiong, Shenzhen (CN); Lijun Xue, Shenzhen (CN); Tie Su, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 107 days.

(21) Appl. No.: 17/562,876

(22) Filed: Dec. 27, 2021

(65) Prior Publication Data

US 2022/0124240 A1    Apr. 21, 2022

Related U.S. Application Data

(63) Continuation of application No. PCT/CN2019/093731, filed on Jun. 28, 2019.

(51) Int. Cl.
*H04N 23/62* (2023.01)
*G06V 10/25* (2022.01)
(Continued)

(52) U.S. Cl.
CPC ............... *G06V 10/25* (2022.01); *G06T 7/20* (2013.01); *G06V 10/24* (2022.01); *H04N 23/61* (2023.01); *H04N 23/62* (2023.01); *H04N 23/631* (2023.01)

(58) Field of Classification Search
CPC ..................................................... H04N 23/61
(Continued)

(56) References Cited

U.S. PATENT DOCUMENTS

| 2009/0303342 A1* | 12/2009 | Corcoran | H04N 23/635 |
| | | | 348/222.1 |
| 2019/0011921 A1 | 1/2019 | Wang et al. | |
| 2019/0130191 A1 | 5/2019 | Zhou et al. | |

FOREIGN PATENT DOCUMENTS

| CN | 105678809 A | 6/2016 |
| CN | 106709456 A | 5/2017 |

(Continued)

OTHER PUBLICATIONS

International Search Report of PCT/CN2019/093731 (dated Apr. 2, 2020).

*Primary Examiner* — Joel W Fosselman
(74) *Attorney, Agent, or Firm* — FIDELI LAW PLLC

(57) ABSTRACT

The present disclosure provides a target tracking method and system, a readable storage medium, and a mobile platform. The method includes: obtaining a user's trigger operation on an operation button, and generating a trigger instruction based on the trigger operation to generate a candidate target box; displaying, based on the trigger operation, the candidate target box in a current frame of picture displayed on a display interface to correspond to the feature portion of the predetermined target; obtaining, based on the displayed candidate target box, a box selection operation performed by the user on the operation button, and generating a box selection instruction based on the box selection operation to generate a tracking target box, where the box selection instruction is used to determine that the candidate target boxes is a tracking target box; and tracking the target based on the tracking target box.

20 Claims, 5 Drawing Sheets

(51) Int. Cl.
*G06T 7/20* (2017.01)
*H04N 23/61* (2023.01)
*H04N 23/63* (2023.01)
*G06V 10/24* (2022.01)

(58) Field of Classification Search
USPC .................................................. 348/207.99
See application file for complete search history.

(56) References Cited

FOREIGN PATENT DOCUMENTS

| | | |
|---|---|---|
| CN | 107491742 A | 12/2017 |
| CN | 108476289 A | 8/2018 |
| CN | 108830219 A | 11/2018 |
| CN | 108875269 A | 11/2018 |
| JP | 2007074279 A | 3/2007 |
| WO | 2018137134 A1 | 8/2018 |

* cited by examiner

TARGET TRACKING METHOD AND SYSTEM, READABLE STORAGE MEDIUM, AND MOBILE PLATFORM

RELATED APPLICATIONS

This application is a continuation application of PCT application No. PCT/CN2019/093731, filed on Jun. 28, 2019, and the content of which is incorporated herein by reference in its entirety.

TECHNICAL FIELD

The present disclosure generally relates to the field of target tracking technologies, and more specifically, to a target tracking method and system, a readable storage medium, and a mobile platform.

BACKGROUND

When a handheld gimbal starts an intelligent tracking function, the handheld gimbal needs to provide an initial target box. Currently, most solutions used by gimbal products are to manually draw a box on a screen as an initial target of intelligent tracking. However, during the drawing of the box with a hand, it is necessary to hold the gimbal with one hand and draw the box with the other hand. The method for determining the initial target box of intelligent tracking by manually drawing the box is inconvenient for user to operate, and may cause a non-desirable tracking effect.

Therefore, in view of the foregoing problems, the present disclosure provides a target tracking method and system, a computer-readable storage medium, and a mobile platform.

BRIEF SUMMARY

The present disclosure is proposed to resolve at least one of the foregoing problems. Specifically, according to one aspect, some exemplary embodiments of the present disclosure provide a target tracking method, and the method includes: obtaining, by a target tracking system, a trigger operation on an operation button to generate a trigger instruction, where the trigger instruction enables the target tracking system to operate in a predetermined box selection mode; generating, by the target tracking system based on the trigger instruction, at least one candidate target box under the box selection mode; displaying, by the target tracking system, the at least one candidate target box on a predetermined recognition area of a display interface, where the display interface is displaying a target in a current frame of picture, and each of the at least one candidate target box corresponds to a feature portion of the target; obtaining, based on the at least one candidate target box, a box selection operation on the operation button; generating, based on the box selection operation, a box selection instruction; generating, based on the box selection instruction, a tracking target box among the at least one candidate target box; and tracking the target with the tracking target box.

According to another aspect, some exemplary embodiments of the present disclosure provide a target tracking system, including: at least one storage medium storing a set of instructions for target tracking; and at least one processor in communication with the at least one storage medium, where during operation, the at least one processor executes the set of instructions to: obtain, by a target tracking system, a trigger operation on an operation button to generate a trigger instruction, where the trigger instruction enables the target tracking system to operate in a predetermined box selection mode; generate, by the target tracking system based on the trigger instruction, at least one candidate target box under the box selection mode. display, by the target tracking system, the at least one candidate target box on a predetermined recognition area of a display interface, where the display interface is displaying a target in a current frame of picture, and each of the at least one candidate target box corresponds to a feature portion of the target; obtain, based on the at least one candidate target box, a box selection operation on the operation button; generate, based on the box selection operation, a box selection instruction; generate, based on the box selection instruction, a tracking target box among the at least one candidate target box; and track the target with the tracking target box.

According to yet another aspect, some exemplary embodiments of the present disclosure provide a mobile platform, including: a platform body; at least one operation button, disposed on the platform body; at least one storage medium storing a set of instructions for target tracking; and at least one processor in communication with the at least one storage medium, where during operation, the at least one processor executes the set of instructions to: obtain, by a target tracking system, a trigger operation on an operation button to generate a trigger instruction, where the trigger instruction enables the target tracking system to operate in a predetermined box selection mode; generate, by the target tracking system based on the trigger instruction, at least one candidate target box under the box selection mode; display, by the target tracking system, the at least one candidate target box on a predetermined recognition area of a display interface, where the display interface is displaying a target in a current frame of picture, and each of the at least one candidate target box corresponds to a feature portion of the target; obtain, based on the at least one candidate target box, a box selection operation on the operation button; generate, based on the box selection operation, a box selection instruction; generate, based on the box selection instruction, a tracking target box among the at least one candidate target box; and track the target with the tracking target box.

The method in some exemplary embodiments of the present disclosure includes: obtaining a user's trigger operation on an operation button, and generating a trigger instruction based on the trigger operation to generate at least one candidate target box, where the candidate target box corresponds to a feature portion of a predetermined target in a current frame of picture displayed on a display interface, the trigger instruction is used to operate a predetermined box selection mode, and the predetermined box selection mode is used to generate the candidate target box in a predetermined recognition area; displaying, based on the trigger operation, the candidate target box in the current frame of picture displayed on the display interface to correspond to the feature portion of the predetermined target; obtaining, based on the candidate target box, a box selection operation performed by the user on the operation button, and generating a box selection instruction based on the box selection operation to generate a tracking target box, where the box selection instruction is used to determine that at least one of the candidate target boxes is a tracking target box; and tracking the target based on the tracking target box. By using the method in some exemplary embodiments of the present disclosure, the user does not need to manually draw a box, for example, on a display interface of a screen, but only needs to select at least one generated candidate target box as a tracking target box. For the user, this not only is convenient and labor-saving, but also can provide a high-quality candidate target box for target tracking, thereby improving a target tracking effect. Moreover, when the user selects at least one candidate target box as a tracking target box, the user's hand does not need to leave a mobile platform such as a gimbal to perform the operation on the display interface, and the user only needs to control the operation button to perform a box selection operation. In this way, the user can still hold the mobile platform such as the gimbal with both hands. Therefore, it is more labor-saving and more convenient.

Because the target tracking system, computer-readable storage medium, and mobile platform in some exemplary embodiments of the present disclosure can all implement the target tracking method described in some exemplary embodiments, they also have advantages of the method.

BRIEF DESCRIPTION OF THE DRAWINGS

To describe the technical solutions in some exemplary embodiments of the present disclosure more clearly, the following briefly describes the accompanying drawings required for describing some exemplary embodiments. Apparently, the accompanying drawings in the following description show merely some exemplary embodiments of the present disclosure, and a person of ordinary skill in the art may still derive other drawings from these accompanying drawings without creative efforts.

DETAILED DESCRIPTION

Figure 1:
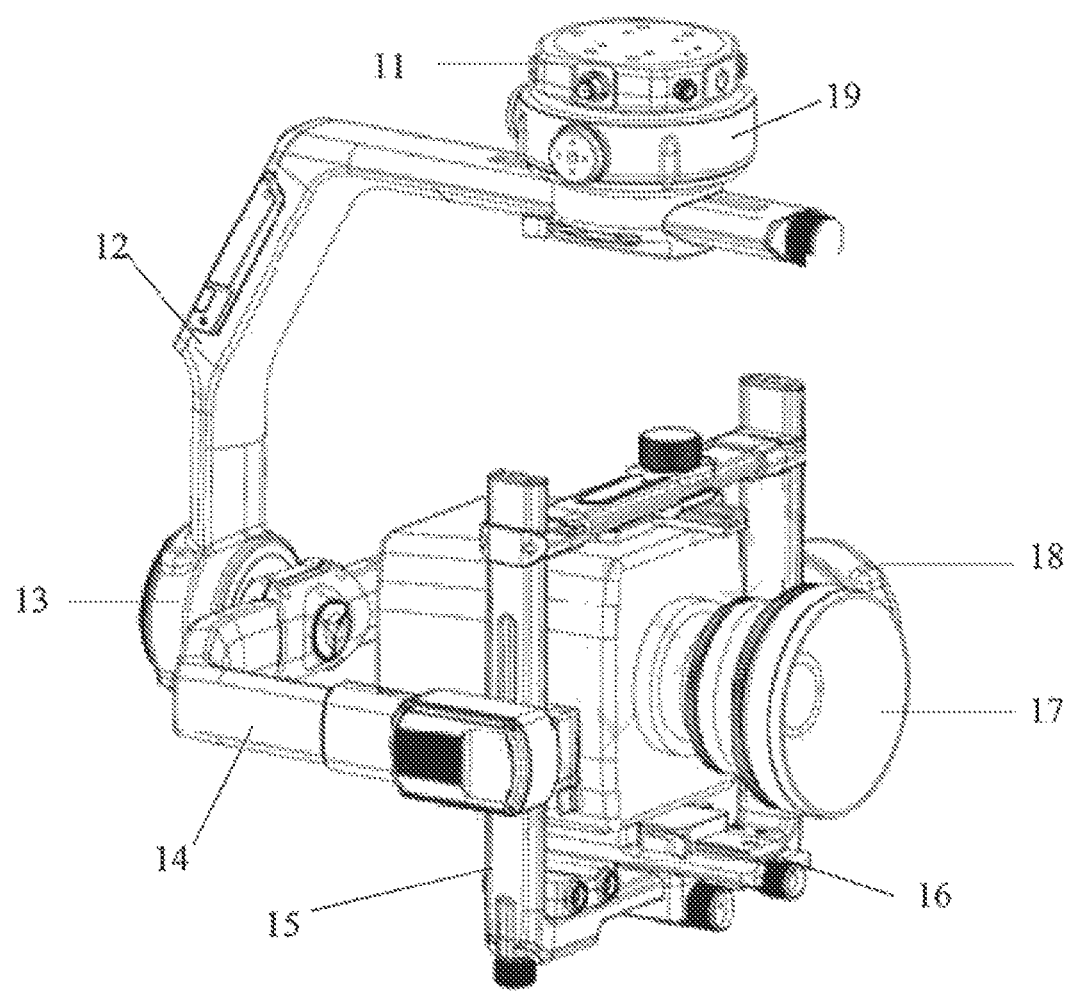
FIG. 1 is a schematic diagram of a handheld gimbal according to some exemplary embodiments of the present disclosure.

To make the objects, technical solutions, and advantages of the present disclosure clear, the following describes some exemplary embodiments according to the present disclosure in detail with reference to the accompanying drawings. Apparently, the described embodiments are only a part of some exemplary embodiments of the present disclosure, rather than all some exemplary embodiments of the present disclosure. It should be understood that the present disclosure is not limited by the exemplary embodiments described herein. All other embodiments that a person skilled in the art may obtain based on the embodiments described in the present disclosure without creative efforts disclosure shall fall within the scope of protection of the present disclosure.

Plenty of specific details are given in the following description to provide a thorough understanding of the present disclosure. However, it is obvious to a person skilled in the art that the present disclosure can be implemented without one or more of these details. In other examples, to avoid confusion with the present disclosure, some technical features well known in the art are not described.

It should be understood that the present disclosure can be implemented in different forms and should not be construed as being limited to some exemplary embodiments provided herein. On the contrary, these embodiments are provided to make the disclosure thorough and understandable, and fully convey the scope of the present disclosure to a person skilled in the art.

The terms used herein are only intended to describe specific embodiments and not used as a limitation on the present disclosure. The terms "a", "one", and "said/the" of singular forms used herein are also intended to include plural forms, unless otherwise specified in the context explicitly. It should also be understood that the terms "including" and/or "including", when used in this disclosure, indicate presence of the described feature, integer, step, operation, element, and/or component. However, this does not exclude presence or addition of one or more other features, integers, steps, operations, elements, components, and/or groups thereof. When used herein, the term "and/or" includes any and all combinations of related listed items.

To enable a thorough understanding of the present disclosure, a detailed structure is described in the following description to explain the technical solutions provided in the present disclosure. Some exemplary embodiments of the present disclosure are hereinafter described in detail. However, in addition to these detailed descriptions, the present disclosure may also have other implementations.

The technology described in some exemplary embodiments of the present disclosure may be applied to a mobile platform. The mobile platform in some exemplary embodiments of the present disclosure includes a platform body for mounting a photographing apparatus. The mobile platform having the photographing apparatus can shoot pictures of an external environment, objects, and scenes to collect pictures or video information, or the like. In some exemplary embodiments, the mobile platform includes at least one of a gimbal, an unmanned aerial vehicle, a vehicle, a robot, and a boat. In some exemplary embodiments, the mobile platform mainly includes a gimbal, and in particular, a handheld gimbal. When the photographing apparatus is mounted on the gimbal, the platform body is a gimbal body. When the photographing apparatus is applied to an unmanned aerial vehicle, the platform body is a body of the unmanned aerial vehicle. When the photographing apparatus is applied to a vehicle, the platform body is a body of the vehicle. The vehicle may be an autonomous vehicle or a semi-autonomous vehicle, and is not limited herein. When the photographing apparatus is applied to a remotely controlled vehicle, the platform body is a body of the remotely controlled vehicle. When the photographing apparatus is applied to a robot, the platform body is the robot. The mobile platform can track a target photographed by the photographing apparatus. Tracking usually means that the photographing apparatus is aligned with a tracking object (for example, a predetermined target corresponding to a tracking target box) in a photographing process, so that the tracking object is still in a field of view of a lens of the photographing apparatus during moving.

An application scenario in which a method of some exemplary embodiments of the present disclosure is mainly applied to a gimbal, and in particular, to a handheld gimbal, is used as an example. The gimbal may be a supporting device for mounting and fixing the photographing apparatus. The gimbal in some exemplary embodiments of the present disclosure may be a handheld gimbal, and the gimbal may also be disposed on the mobile platform, such as an unmanned aerial vehicle or a vehicle.

In some exemplary embodiments of the present disclosure, the gimbal includes at least one rotary shaft mechanism (not shown), and the rotary shaft mechanism may include a motor (for example, a brushless motor or a brushed motor) and a shaft arm. For example, in the gimbal shown in FIG. 1, the rotary shaft mechanism may include a pitch mechanism, a roll mechanism, and a yaw axis mechanism. The plurality of rotary shaft mechanisms may be connected in series. As shown in FIG. 1, the pitch mechanism may include a pitch axis motor 18 and a pitch axis arm 15, the roll mechanism may include a roll axis motor 13 and a roll axis arm 14, and the yaw axis mechanism may include a yaw axis motor 19 and a yaw axis arm 12.

In some exemplary embodiments, as shown in FIG. 1, the platform body of the gimbal may further include a base 11. When the gimbal is a handheld gimbal, the base may move with the movement of a user's hand. When the gimbal is connected to another mobile platform, the base may be rigidly connected to the mobile platform and move with the movement of the mobile platform.

In some exemplary embodiments, as shown in FIG. 1, the gimbal may further include an inertial measurement unit (IMU) 16. The IMU 16 has no movement relative to the photographing apparatus (such as a camera), and may be configured to measure the posture of a camera. For example, the IMU may be rigidly fixed to a fixing mechanism of the camera. In some exemplary embodiments, an IMU (not shown) may also be disposed on the base of the gimbal, and the IMU has no movement relative to the base. For example, the IMU may be rigidly fixed to the base.

When the photographing apparatus 17 is mounted on the gimbal for photographing, sometimes the photographing apparatus 17 may need to photograph a slow-moving target, while sometimes it may need sudden acceleration in order to photograph a fast-moving target.

In the case where the gimbal is a handheld gimbal, when photographing a moving target, the user may rotate the gimbal, that is, rotate the base of the gimbal, and a controller can control the rotary shaft mechanism of the gimbal, so that a target posture of the photographing apparatus matches a posture of the base. When the gimbal is a handheld gimbal, a handheld stick or a handheld ring may be connected to the base, and the user can control movement of the gimbal by using the handheld stick or the handheld ring.

Although the following embodiments are described in detail by using an application scenario in which the mobile platform is a gimbal, and in particular, a handheld gimbal, the present disclosure is not limited to this. Actually, the mobile platform may be in any one of the forms described above.

Figure 2:
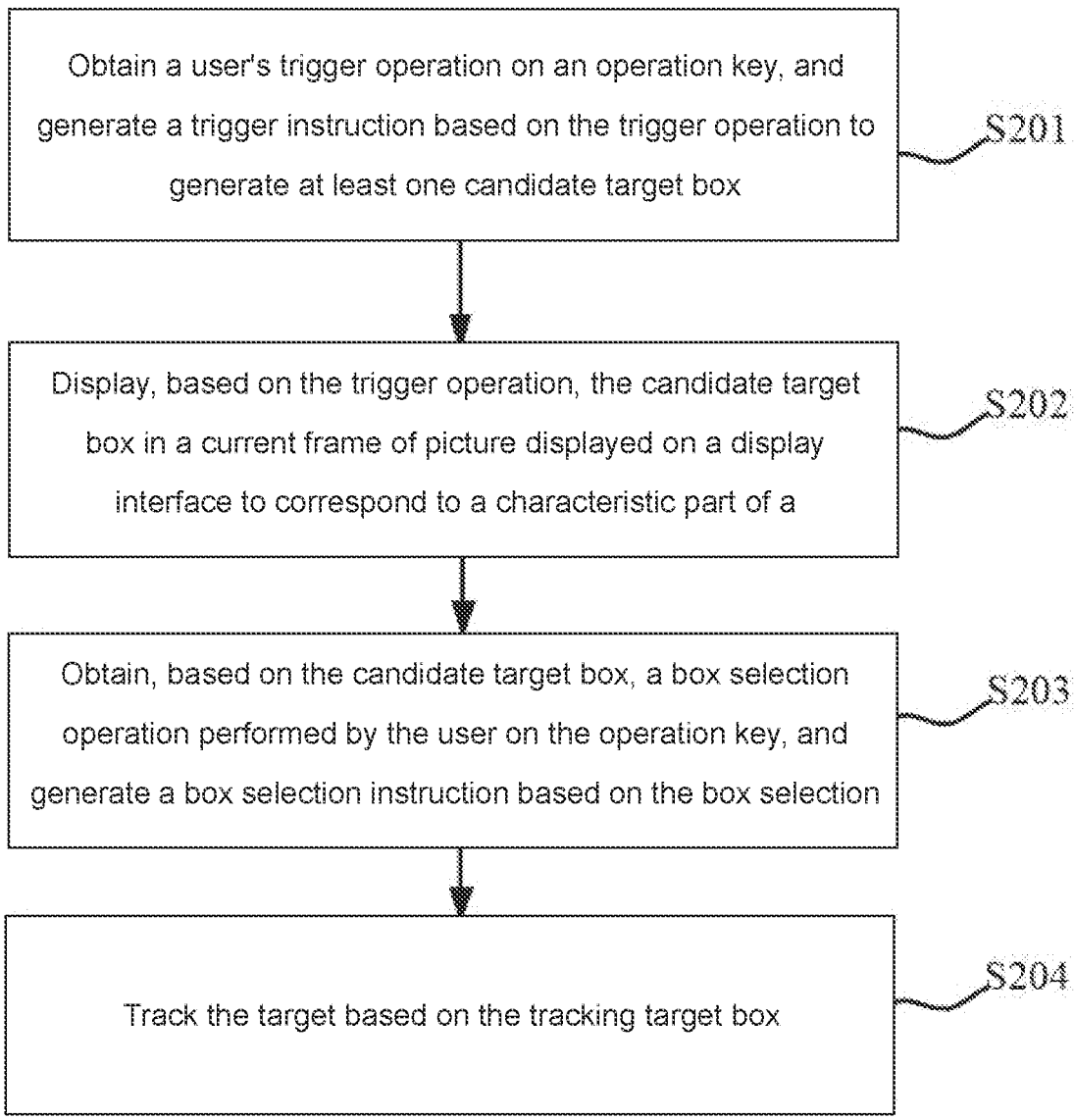
FIG. 2 is a schematic flowchart of a target tracking method according to some exemplary embodiments of the present disclosure.

Based on the foregoing application scenario, and considering that a current method for determining an initial target box of intelligent tracking by manually drawing a box is inconvenient for a user to operate and may also cause an undesirable tracking effect, some exemplary embodiments of the present disclosure provide a target tracking method. As shown in FIG. 2, the method includes the following steps. Step S201: Obtain a user's trigger operation on an operation button, and generate a trigger instruction based on the trigger operation to generate at least one candidate target box, where the trigger instruction is used to operate a predetermined box selection mode, the predetermined box selection mode is used to generate the candidate target box(es) in a predetermined recognition area (certainly, the recognition area is not necessary to be predetermined), and the candidate target box(es) corresponds to a feature portion of a predetermined target (certainly, the target is not necessary to be pre-determined). Step S202: Display, based on the trigger operation, the candidate target box in a current frame of picture displayed on a display interface to correspond to the feature portion of the predetermined target. Step S203: Obtain, based on the displayed candidate target box, a box selection operation performed by the user on the operation button, and generate a box selection instruction based on the box selection operation to generate a tracking target box, where the box selection instruction is used to determine that at least one of the candidate target boxes is a tracking target box. Step S204: Track the target based on the tracking target box. By using the method in some exemplary embodiments of the present disclosure, the user does not need to manually draw a box, for example, on a display interface of a screen, but only needs to select at least one generated candidate target box as a tracking target box. For the user, this not only is convenient and labor-saving, but can also provide a high-quality candidate target box for target tracking, thereby improving a target tracking effect. Moreover, when the user selects at least one candidate target box as a tracking target box, the user's hand does not need to leave a mobile platform such as a gimbal to perform an operation on the display interface, and the user only needs to control the operation button to perform a box selection operation. For example, the operation button is mounted on a holding part of the handheld gimbal. In this way, the user can still hold the mobile platform such as the gimbal with both hands. Therefore, it is labor-saving and convenient.

The following describes in detail the target tracking method, target tracking system, computer-readable storage medium, and mobile platform in the present disclosure with reference to the accompanying drawings. In absence of conflicts, the following embodiments and features thereof may be combined to each other.

Figure 3:
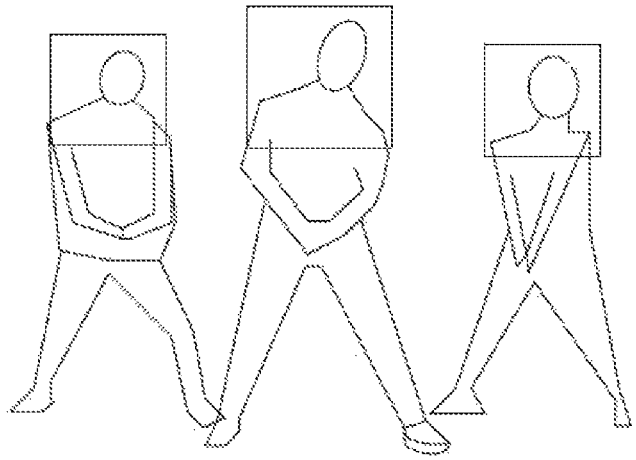
FIG. 3 is a schematic diagram of a candidate target box generated according to some exemplary embodiments of the present disclosure.

Firstly, a target tracking method in some exemplary embodiments of the present disclosure is described with reference to FIG. 2 to FIG. 4.

In some exemplary embodiments, as shown in FIG. 2, step S201 is to obtain a user's trigger operation on an operation button, and generate a trigger instruction based on the trigger operation so as to generate at least one candidate target box, where the trigger instruction is used to operate a predetermined box selection mode (certainly, the box selection mode is not necessary to be predetermined), the predetermined box selection mode is used to generate the candidate target box(es) in a predetermined recognition area, and the candidate target box(es) corresponds to a feature portion of a predetermined target.

In an example, the target tracking method is applied to a mobile platform equipped with a photographing apparatus, and the photographing apparatus may be a built-in device of the mobile platform or may be mounted on the mobile platform. In an example, the operation button is disposed on the mobile platform to facilitate user operations.

The mobile platform may include at least one of the following: a gimbal, an unmanned aerial vehicle, a vehicle, a robot, and a boat. Alternatively, the target tracking method is applied to a mobile platform equipped with a gimbal, and a photographing apparatus may be disposed on the gimbal. In this embodiment, a case in which the mobile platform is a gimbal, and in particular, a handheld gimbal, is mainly used as an example to explain and describe the method of some exemplary embodiments of the present disclosure, but it should be understood that this is not intended to limit the present disclosure.

Generally, the handheld gimbal may be a stabilizer of a motion photographing apparatus. A photographing apparatus such as a camcorder, a camera, or a smartphone may be disposed on the handheld gimbal, and the handheld gimbal can quickly and stably control the photographing apparatus to maintain a determined posture when photographing during moving, and may also perform an adaptive adjustment on an angle of view of the photographing apparatus during moving.

The target in this disclosure may be any object or mobile object that can be recognized. The target may be an animal with a body and a head, a mobile robot, an animal simulation robot (including but not limited to a robot dog), a person, or the like.

The operation button includes at least one of a joystick, a button, or any other operation button that can be operated by the user. More specifically, the operation button is, for example, a joystick disposed on the handheld gimbal and/or a button disposed on the handheld gimbal. The joystick may be capable of controlling the photographing apparatus to perform a corresponding function. In some exemplary embodiments, the joystick is capable of generating a trigger instruction to execute a predetermined box selection mode, and the button may include a function control button of the photographing apparatus, such as a trigger button (trigger button).

The user may perform different trigger operations on the same operation button to generate different trigger instructions, or the user may perform trigger operations on different operation buttons to generate different trigger instructions. For example, the trigger operation may include a first trigger operation and/or a second trigger operation, where the first trigger operation is used to generate a first trigger instruction, and the first trigger instruction is used to operate the first box selection mode; and the second trigger operation is used to generate a second trigger instruction, and the second trigger instruction is used to operate the second box selection mode. Operating different box selection modes through different trigger operations may allow the user to have richer operation experience based on their requirements; no matter which box selection mode is used, the user can obtain a candidate target box(es) in good quality.

The trigger operation may include at least one of the following: the user presses the joystick, the user double-taps the button, the user taps the button, the user touches and holds the button, the user quickly presses the button, and the like, and selection of the user operation is flexible. The trigger operation may be predefined by the user to enhance user experience; or may be a default operation, which is convenient for the user to quickly adapt to the trigger operation. In this embodiment, the trigger operation includes the first trigger operation, the first trigger operation may include that the user presses the joystick, and the first trigger instruction is used to operate the first box selection mode; or the trigger operation may include the second trigger operation, the second trigger operation may include that the user double-taps the button to generate the second trigger instruction, and the second trigger instruction is used to operate the second box selection mode.

In an example, the predetermined box selection mode may be used to generate the candidate target box in the predetermined recognition area, and the predetermined box selection mode includes the first box selection mode and/or the second box selection mode, where the first box selection mode and the second box selection mode have different recognition areas. For example, the predetermined recognition area in the first box selection mode is the display interface itself, and the display interface may include a display screen of the photographing apparatus disposed on the gimbal; and the predetermined recognition area in the second box selection mode is a partial area of the display interface corresponding to a first default target box, and the first default target box is used to track a target in the first default target box by default before a tracking target box is generated. The predetermined recognition area in the second box selection mode may be smaller than the recognition area corresponding to the first box selection mode. Through setting different recognition area ranges it would be convenient for the user to properly select a box selection mode based on a quantity of predetermined targets in an actual scene or based on a requirement of the user.

In some exemplary embodiments, the first default target box is located in a center area of a lens of the photographing apparatus that shoots a current frame of picture, where the first default target box may include a rectangular box or other suitable shapes. In some exemplary embodiments, the first default target box is mainly a rectangular box. In the case where the second box selection mode is in operation, when the feature portion of the target is not detected in the recognition area corresponding to the second box selection mode (that is, in the first default target box), the first default target box remains unchanged, that is, its size and position always remain unchanged, so that the target in the first default target box is tracked by default before the tracking target box is generated.

In an example, the generating of the candidate target box in the predetermined recognition area based on the predetermined box selection mode that is in operation specifically includes: generating, based on the predetermined box selection mode that is in operation, the candidate target box in the predetermined recognition area corresponding to the predetermined box selection mode. For example, when the first box selection mode is in operation, the predetermined recognition area corresponding to the first box selection mode is a display interface, the display interface may include the display screen of the photographing apparatus disposed on the gimbal, and a candidate target box is generated on the display interface. When the second box selection mode is in operation, the predetermined recognition area corresponding to the second box selection mode is a display interface, the predetermined recognition area is a partial area of the display interface corresponding to the first default target box, and a candidate target box is generated in the partial area of the display interface corresponding to the first default target box.

The candidate target box corresponds to the feature portion of the predetermined target. For example, the candidate target box is used to enclose the feature portion of the predetermined target. A shape of the candidate target box may be any suitable shape, thereby helping the user select, based on a requirement, the predetermined target enclosed by the candidate target box. For example, as shown in FIG. 2, the candidate target box includes a rectangular box, or may be a circular box, an elliptical box, or a polygonal box. The shape of the candidate target box may be predefined by the user to meet different aesthetic requirements of the user to improve user experience. The candidate target box corresponding to the shape of the predetermined target may be further generated based on the shape of the predetermined target, so that the candidate target box can enclose the predetermined target better, without enclosing other targets than the predetermined target. This helps the user select and lock, based on a requirement, the predetermined target that needs to be tracked.

In an example, if there is at least one predetermined target, the candidate target box corresponds to the feature portion of the predetermined target. In some exemplary embodiments, each candidate target box is used to correspond to a feature portion of each predetermined target, that is, each predetermined target corresponds to only one candidate target box, and the candidate target box corresponds to a feature portion of the predetermined target. For example, as shown in FIG. 2, the feature portion of the target, such as a head and shoulders, in the recognition area in the current frame of picture displayed on the display interface is detected and recognized based on a trained deep learning model. In this case, the detected and recognized feature portion of each head and shoulder(s) indicates one predetermined target, and each candidate target box generated is used to correspond to the feature portion of the head and shoulders of each predetermined target. Alternatively, each candidate target box corresponds to a feature portion of at least one predetermined target. For example, each candidate box may correspond to one predetermined target, or may correspond to a plurality of predetermined targets. For example, the candidate target box corresponds to feature portions of two or more predetermined targets, such as heads. Therefore, a plurality of predetermined targets may be selected in one candidate target box, so that the plurality of predetermined targets may be tracked simultaneously. Still referring to FIG. 2, step S202 is to display, based on the trigger operation, the candidate target box in the current frame of picture displayed on the display interface to correspond to the feature portion of the predetermined target. The user only needs to perform the trigger operation on the operation button to generate and display the candidate target box to correspond to the feature portion of the predetermined target. This overcomes a disadvantage that when a user uses one hand to draw a box, the gimbal is held only by the other hand; while the gimbal is often too heavy to be held by one hand. Thus, the user does not need to draw a box, for example, on the display interface of the screen. For the user, this not only is convenient and labor-saving, but also can overcome a disadvantage that a jitter likely occurs when a user uses one hand to hold the gimbal and the other hand to draw a box on a display screen of a mobile phone, which affects the normal drawing of the box. Therefore, a high-quality candidate target box is provided for target tracking, and a target tracking effect is improved.

In an example, the displaying, based on the trigger operation, of the candidate target box in the current frame of picture displayed on the display interface to correspond to the feature portion of the predetermined target may specifically include: first operating the predetermined box selection mode based on the trigger instruction, for example, generating the first trigger instruction based on, for example, the first trigger operation of pressing the joystick by the user, and operating the first box selection mode based on the first trigger instruction, or generating the second trigger instruction based on, for example, the second trigger operation of double-tapping the button by the user, and operating the second box selection mode based on the second trigger instruction; and then generating the candidate target box in the predetermined recognition area based on the predetermined box selection mode that is in operation (for example, the first box selection mode or the second box selection mode), where the candidate target box corresponds to the feature portion of the predetermined target, and more specifically, generating, based on the predetermined box selection mode that is in operation, the candidate target box in the predetermined recognition area corresponding to the predetermined box selection mode, where for example, the predetermined recognition area corresponding to the first box selection mode is the display interface, and the display interface may include the display screen of the photographing apparatus disposed on the gimbal; and the predetermined recognition area corresponding to the second box selection mode is a partial area of the display interface corresponding to the first default target box, and the first default target box is used to track the target in the first default target box by default before the tracking target box is generated.

In an example, the generating of the candidate target box in the predetermined recognition area based on the predetermined box selection mode that is in operation includes the following steps A1 and A2.

Step A1 is to obtain the feature portion of the target in the recognition area in the current frame of picture displayed on the display interface, where the feature portion includes at least one portion of a body of the target, and the at least one portion of the body includes at least one of the following: a face, a head, a shoulder(s), and a torso; or the feature portion may further include a posture of the body of the target, for example, shaking the head, shaking the shoulder(s), stretching a leg(s), opening the mouth, blinking, etc.

The feature portion of the target in the recognition area in the current frame of picture displayed on the display interface may be recognized based on any suitable target detection method, so that the candidate target box is generated based on the recognized feature portion. This overcomes a disadvantage that a box drawn by a hand has poor quality and that the drawn box is either too small (only a part of the target is selected) or too large (a lot of unnecessary background parts are selected), which greatly impairs an effect of intelligent tracking. In some exemplary embodiments, the feature portion of the target in the recognition area in the current frame of picture displayed on the display interface may be detected and recognized based on the trained deep learning model. The trained deep learning model is obtained through training based on a current common image target recognition model. For example, the model is trained using a neural network model such as a single shot multiple box detector (SSD), R-CNN, etc. based on deep learning. The model is trained with annotated data. When the training is completed, the model can read pictures such as the current frame of picture, and automatically output position information (x, y, w, h) of all candidate target boxes in the current frame of picture, where (x, y) is coordinates of a central point of a candidate target box, and w and h are a width and a height of the candidate target box respectively.

The feature portion of the predetermined target to be recognized can be properly selected based on a distance between the photographing apparatus and the target. For example, when the distance between the target and the photographing apparatus is relatively long, a size of the feature portion such as the face and the head in an image of the target captured by the photographing apparatus is small, which may not be easily recognized. Therefore, in this scenario, a feature portion of a larger size, such as the torso, may be selected as the feature portion to be recognized. Likewise, when the distance between the target and the photographing apparatus is a medium distance, a feature portion of a medium size such as the head and shoulders may be selected as the feature portion to be recognized, or when the distance between the target and the photographing apparatus is short, a feature portion of a small size such as the face or the head may be selected as the feature portion to be recognized.

Step A2 is to generate the candidate target box in the predetermined recognition area based on the feature portion. For example, a candidate target box is generated in the predetermined recognition area based on the feature portion that is detected and recognized, where the candidate target box corresponds to the corresponding feature portion of the predetermined target. For example, if a part of a head and shoulders of a predetermined target is detected and recognized, a candidate target box is generated to correspond to the part of the head and shoulders of the predetermined target. For example, the candidate target box encloses the head and shoulder portion of the corresponding predetermined target. If head and shoulder portions of a plurality of predetermined targets are detected, a plurality of candidate target boxes may be generated, and each candidate target box corresponds to the head and shoulder portion of a predetermined target.

In a specific example, the displaying, based on the trigger operation, of the candidate target box in the current frame of picture displayed on the display interface includes: obtaining position information of the candidate target box, where the position information includes at least one of the coordinates of the central point of the candidate target box and size information of the candidate target box, the candidate target box may include a rectangular box, and the size information includes the width and height of the candidate target box, or the candidate target box may include a circular box, and the size information includes a radius of the candidate target box. When each candidate target box corresponds to only one predetermined target, the size information of the candidate target box should ensure that only the feature portion of the corresponding predetermined target is enclosed, and that feature portions of other predetermined targets cannot be enclosed, so as to avoid failure of tracking only the predetermined target that the user wants to track because the candidate target box corresponds to more predetermined targets. Subsequently, the candidate target box is displayed, based on the position information, in the current frame of picture displayed on the display interface. The position information of each candidate target box has been determined through the foregoing steps, thus this step only needs to display the candidate target box based on the position information in. Therefore, the user can intuitively observe the candidate target box corresponding to each predetermined target, and it is convenient for the user to select, based on a requirement of the user, the target that the user wants to track.

Still referring to FIG. 2, step S203 is to obtain, based on the displayed candidate target box, a box selection operation performed by the user on the operation button, and generate a box selection instruction based on the box selection operation so as to generate a tracking target box, where the box selection instruction is used to determine that at least one of the candidate target boxes is a tracking target box.

Specifically, the user performs the box selection operation based on the candidate target box displayed on the display interface to generate the tracking target box. The box selection operation may be a box selection operation performed by the user on the operation button. For example, when the first box selection mode is in operation, for example, an operation of pressing the joystick again by the user may be considered as the box selection operation, or another operation on the operation button may be used as the box selection operation, or when the second box selection mode is in operation, for example, an operation of tapping the button may considered as the box selection operation.

In an example, when the first box selection mode is in operation, the method further includes: in the current frame of picture displayed on the display interface, setting the candidate target box closest to a center of the current frame of picture as a second default target box, and the second default target box is used to track a target in the second default target box by default before the tracking target box is generated. For example, assuming that a width and a length of the current frame of picture are W and H, the second default target box is $$\left(x - \frac{W}{2}\right)^2 + \left(y - \frac{H}{2}\right)^2,$$

where (x, y) are the coordinates of a central point of the second default target box. Generally, a more important target is usually roughly located in the center of the current frame of picture. Therefore, in the current frame of picture displayed on the display interface, the candidate target box closest to the center of the current frame of picture is set as the second default target box. When no candidate target box is selected, the target in the second default target box is tracked by default. If the target in the second default target box is the target that the user has predetermined to track, there is no need to switch among the plurality of candidate targets, and the user only needs to perform a box selection operation on the operation button to determine the second default target box as the tracking target box. Therefore, the setting of the second default target box can make it more convenient for the user to operate the operation button to start target tracking.

In an example, when the first box selection mode is in operation, the method in some exemplary embodiments of the present disclosure includes: first sorting all the candidate target boxes based on central positions of the candidate target boxes; then obtaining a selection operation performed by the user on the operation button, to generate an indicated direction, where the selection operation may be an operation performed by the user on the joystick, such as up, down, left, or right, and the indicated direction includes at least one of the following: up, down, left, and right; then switching from the currently selected candidate target box to a predetermined selected candidate target box based on the indicated direction, for example, if the indicated direction indicates that a current direction of the joystick is right, switching to a next candidate target box on the right; or if the indicated direction indicates that a current direction of the joystick is left, switching to a next candidate target box on the left, until reaching a predetermined selected candidate target box, in some exemplary embodiments, to enable the user to conveniently observe which candidate target box is the currently selected candidate target box, a color or shape or the like of the currently selected candidate target box may be set to be different from those of other candidate target boxes, for example, the currently selected candidate target box is set to red, and the other candidate target boxes are set to green; and finally selecting at least one of the candidate target boxes as a tracking target box based on the box selection operation performed by the user on the operation button. For example, after switching to the predetermined selected candidate target box, the user presses, for example, an operation button of the joystick to determine the candidate target box as a tracking target box. According to this method, when the plurality of candidate target boxes are displayed on the display interface, switching is performed among the plurality of candidate target boxes based on the user's selection operation, for example, on the operation button of the joystick, and then at least one of the candidate target boxes is determined as a tracking target box based on the user's box selection operation on the operation button. The user only needs to perform the foregoing operation by using the operation button, and the hand of the user does not need to leave the mobile platform such as the gimbal during the operation. Therefore, the operation becomes simpler, more labor-saving, and more convenient for subsequently starting the tracking.

In another example, when the second box selection mode is in operation, for example, operating the second box selection mode based on a trigger operation of double-tapping the button by the user, the method includes: obtaining a feature portion of the target in the first default target box (that is, in the recognition area corresponding to the second box selection mode) in the current frame of picture displayed on the display interface, where the obtaining method may be based on the description in the foregoing embodiments and will not be described again herein; and adjusting the first default target box to the candidate target box based on the feature portion, and specifically, when detecting the feature portion of the predetermined target, such as the head, face, head and shoulder(s), or torso, in the first default target box according to the foregoing method, adjusting the first default target box to the candidate target box. Since an area enclosed by the first default target box is relatively large, when the feature portion of the predetermined target is detected, the feature portion is often located in a small area of the first default target box. Therefore, the first default target box needs to be adjusted to the candidate target box. For example, a size of the first default target box is reduced to obtain the feature portion of the predetermined target that is detected and recognized and can be appropriately enclosed by the candidate target box. When the second box selection mode is in operation, the candidate target box is locked by the box selection operation on the operation button as a tracking target box. However, because the first default target box located in the center area of the lens is adjusted to the candidate target box, the box selection operation also locks the candidate target box in the center area of the lens as the tracking target. There is no need to manually draw a box, and the candidate target box corresponding to the predetermined target can be generated without an additional operation on the button. Therefore, user operations are reduced, more time and labor are saved, and user experience is improved. In addition, quality of the candidate target box generated in this method becomes higher.

In other examples, when the second box selection mode is in operation, when the feature portion of the target is not detected in the recognition area (that is, in the first default target box), the first default target box remains unchanged, that is, its size and position always remain unchanged, so that the position of the first default target box changes with the change of a lens position of the photographing apparatus before the tracking target box is generated, and that the first default target box is always in the fixed center area of the lens.

Still referring to FIG. 2, step S204 is to track the target based on the tracking target box. For example, the predetermined target corresponding to the tracking target box is tracked based on the tracking target box. By performing tracking (especially intelligent tracking), the predetermined target can be tracked and photographed in all directions from a plurality of angles to improve a photographing effect.

In an example, the tracking of the target based on the tracking target box includes: aligning the mobile platform, with the target corresponding to the tracking target box based on the tracking target box, and synchronously moving with the target to track the target. Tracking usually means that the photographing apparatus is aligned with the tracking object (for example, the predetermined target corresponding to the tracking target box) in the photographing process, so that the tracking object is still in a field of view of the lens of the photographing apparatus during moving.

Hereinafter, a method for target tracking in a specific application scenario in some exemplary embodiments of the present disclosure will be described with reference to FIG. 3 and FIG. 4. In the application scenario shown in FIG. 3, a photographing apparatus on a handheld gimbal is used for photographing a dancer who is dancing.

Figure 4:
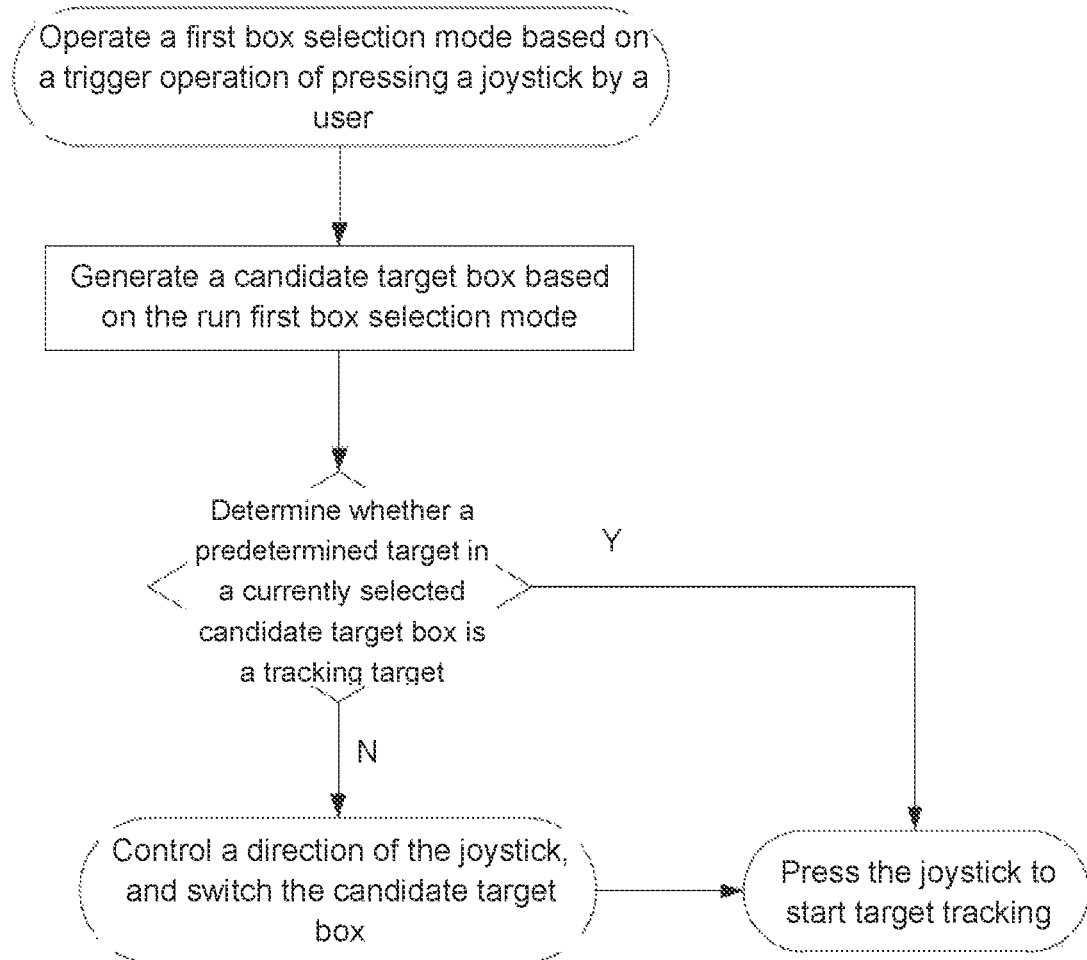
FIG. 4 is a schematic flowchart of a first box selection mode according to some exemplary embodiments of the present disclosure.

The target tracking method shown in FIG. 4 includes: firstly operating a first box selection mode based on a trigger operation of pressing a joystick by a user; and then generating a candidate target box based on the first box selection mode that is in operation. For the method of generating the candidate target box, reference may be made to the descriptions of the above embodiments. In the present disclosure scenario, a head and shoulder(s) of a predetermined target in a current frame of picture can be detected and recognized, and a candidate target box corresponding to a head and shoulder(s) of each predetermined target can be generated, for example, three candidate target boxes shown in FIG. 3, where a candidate target box in a central position may be a second default target box, and a currently selected candidate target box may also be set to a color different from the color(s) of other candidate target boxes. For example, the currently selected candidate target box is red, and the other candidate target boxes are green. Subsequently, the user may need to determine whether the predetermined target in the currently selected candidate target box is a tracking target, and if yes, the user presses the joystick to start target tracking; if not, controls a direction of the joystick, and switches the candidate target box until reaches a predetermined selected candidate target box, and then presses the joystick to start target tracking. Through this method, the user can implement an operation of drawing a box to track the target, and the user's hand does not need to leave a handheld gimbal for drawing.

In summary, through the method in some exemplary embodiments of the present disclosure, a user does not need to manually draw a box, for example, on a display interface of a screen, but only needs to select at least one generated candidate target box as a tracking target box. For the user, this not only is convenient and labor-saving, but also can provide a high-quality candidate target box for target tracking, thereby improving a target tracking effect. Moreover, when the user selects at least one candidate target box as a tracking target box, the user's hand does not need to leave a mobile platform such as a gimbal to perform an operation on the display interface, and the user only needs to control the operation button to perform a box selection operation. In this way, the user can still hold the mobile platform such as the gimbal with both hands. Therefore, it is more labor-saving and more convenient.

Hereinafter, a target tracking system according to some exemplary embodiments of the present disclosure will be described with reference to FIG. 5.

Figure 5:
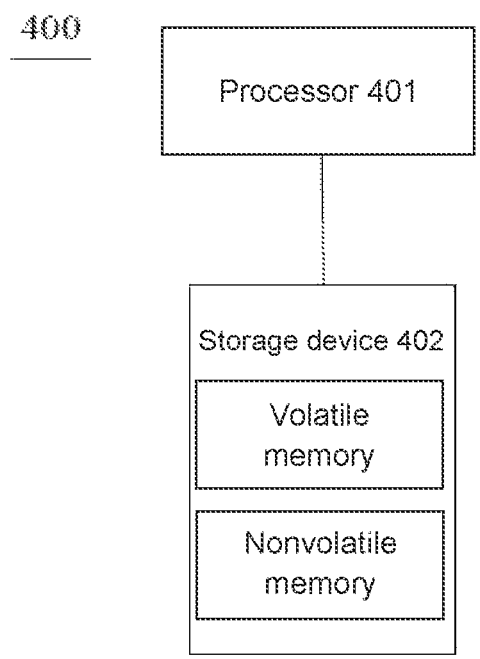
FIG. 5 is a schematic block diagram of a target tracking system according to some exemplary embodiments of the present disclosure.

As shown in FIG. 5, the target tracking system 400 includes one or more storage devices 402. The storage device 402 is configured to store an executable instruction. The target tracking system 400 further includes one or more processors 401 that work separately or jointly. The processor is configured to perform steps of the target tracking method 200 in the above embodiments.

The processor 401 may be a central processing unit (CPU), a graphics processing unit (GPU), an application-specific integrated circuit (ASIC), a field-programmable gate array (FPGA), or a processing unit that is in another form and capable of data processing and/or instruction execution. The processor 401 may be a central processing unit (CPU), or a processing unit that is in another form and capable of data processing and/or instruction execution and capable of controlling other components in the target tracking system 400 to implement expected functions. For example, the processor 401 can include one or more embedded processors, a processor core, a microprocessor, a logic circuit, a hardware finite state machine (FSM), a digital signal processor (DSP), or a combination thereof.

The storage device 402 may include one or more computer program products, where the computer program product may include various forms of computer-readable storage media, for example, a volatile memory and/or a nonvolatile memory. The volatile memory may include, for example, a random access memory (RAM) and/or a cache. The nonvolatile memory may include, for example, a read-only memory (ROM), a hard disk, or a flash memory. The computer-readable storage medium may store one or more computer program instructions. The processor 401 may operate the program instruction to implement the target tracking method (implemented by the processor(s)) in the following embodiments of the present disclosure and/or other expected functions. The computer-readable storage medium may further store various application programs and various data, for example, various data used and/or generated by the application program.

In some exemplary embodiments, the processor is configured to perform steps of the target tracking method 200 in the above embodiments, including: obtaining a user's trigger operation on an operation button, and generating a trigger instruction based on the trigger operation to generate at least one candidate target box, where the trigger instruction is used to operate a predetermined box selection mode, the predetermined box selection mode is used to generate the candidate target box in a predetermined recognition area, and the candidate target box corresponds to a feature portion of a predetermined target; displaying, based on the trigger operation, the candidate target box in a current frame of picture displayed on a display interface to correspond to the feature portion of the predetermined target, where the feature portion includes at least one portion of a body of the target, or the feature portion includes a posture of a body part of the target, and at least one portion of the body includes at least one of the following: a face, a head, shoulders, and a torso; then obtaining, based on the candidate target box, a box selection operation performed by the user on the operation button, and generating a box selection instruction based on the box selection operation so as to generate a tracking target box, where the box selection instruction is used to determine that at least one of the candidate target boxes is a tracking target box; and tracking the target based on the tracking target box.

In some exemplary embodiments, the predetermined box selection mode includes a first box selection mode and/or a second box selection mode, where the predetermined recognition area in the first box selection mode is a display interface; and the predetermined recognition area in the second box selection mode is a partial area of a display interface corresponding to a first default target box, and the first default target box is used to track a target in the first default target box by default before the tracking target box is generated.

In some exemplary embodiments, the trigger operation includes a first trigger operation and/or a second trigger operation, where the first trigger operation is used to generate a first trigger instruction, and the first trigger instruction is used to operate the first box selection mode; and the second trigger operation is used to generate a second trigger instruction, and the second trigger instruction is used to operate the second box selection mode.

In some exemplary embodiments, the operation button includes at least one of a joystick and a button. The trigger operation includes at least one of the following: the user presses the joystick, and the user double-taps the button.

In some exemplary embodiments, the displaying, based on the trigger operation, of the candidate target box in the current frame of picture displayed on the display interface specifically includes: operating the predetermined box selection mode based on the trigger instruction; and generating the candidate target box in the predetermined recognition area based on the predetermined box selection mode that is in operation, where the candidate target box corresponds to the feature portion of the predetermined target.

In some exemplary embodiments, the generating of the candidate target box in the predetermined recognition area based on the predetermined box selection mode that is in operation specifically includes: generating, based on the predetermined box selection mode that is in operation, the candidate target box in the predetermined recognition area corresponding to the predetermined box selection mode.

In some exemplary embodiments, the displaying, based on the trigger operation, of the candidate target box in the current frame of picture displayed on the display interface includes: obtaining position information of the candidate target box; and displaying, based on the position information, the candidate target box in the current frame of picture displayed on the display interface. In some exemplary embodiments, the position information includes at least one of coordinates of a central point of the candidate target box and size information of the candidate target box. The candidate target box includes a rectangular box, and the size information includes a width and a height of the candidate target box.

In some exemplary embodiments, the generating of the candidate target box in the predetermined recognition area based on the predetermined box selection mode that is in operation includes: obtaining the feature portion of the target in the recognition area in the current frame of picture displayed on the display interface, where the obtaining of the feature portion of the target in the recognition area in the current frame of picture displayed on the display interface specifically includes: detecting and recognizing, based on a trained deep learning model, the feature portion of the target in the recognition area in the current frame of picture displayed on the display interface; and generating the candidate target box in the predetermined recognition area based on the feature portion.

In some exemplary embodiments, when operating the first box selection mode, the processor(s) of the target tracking system is configured to perform the following steps, including: sorting all the candidate target boxes based on central positions of the candidate target boxes; obtaining a selection operation performed by the user on the operation button to generate an indicated direction, where the indicated direction includes at least one of the following: up, down, left, and right; switching from the currently selected candidate target box to a predetermined selected candidate target box based on the indicated direction; and selecting at least one of the candidate target boxes as a tracking target box based on the box selection operation performed by the user on the operation button.

In some exemplary embodiments, when operating the first box selection mode, the processor(s) of the target tracking system is configured to perform the following step, including: in the current frame of picture displayed on the display interface, setting the candidate target box closest to a center of the current frame of picture as a second default target box, where the second default target box is used to track a target in the second default target box by default before the tracking target box is generated.

In some exemplary embodiments, when operating the second box selection mode, the processor of the target tracking system is configured to perform the following steps, including: obtaining a feature portion of the target in the first default target box in the current frame of picture displayed on the display interface, where the first default target box is located in a center area of a lens of a photographing apparatus that shoots the current frame of picture; and adjusting the first default target box to the candidate target box based on the feature portion.

In some exemplary embodiments, when the second box selection mode is in operation, and the feature portion of the target is not detected in the recognition area, the first default target box remains unchanged.

In some exemplary embodiments, the target tracking system is applied to a mobile platform equipped with the photographing apparatus, and the photographing apparatus may be a built-in device of the mobile platform. In some exemplary embodiments, the operation button is disposed on the mobile platform to facilitate user operations. The mobile platform includes at least one of the following: a gimbal, an unmanned aerial vehicle, a vehicle, a robot, and a boat.

In some exemplary embodiments, the tracking of the target based on the tracking target box includes:

aligning the mobile platform based on the tracking target box with the target corresponding to the tracking target box, and synchronously moving with the target to track the target.

In this disclosure, the predetermined target is at least one target, and the candidate target box corresponds to the feature portion of the predetermined target. The predetermined target is at least one target, where each candidate target box corresponds to a feature portion of each predetermined target; or each candidate target box corresponds to a feature portion of at least one predetermined target.

In some exemplary embodiments, the processor(s) of the target tracking system is configured to perform the following steps, including: obtaining, based on the displayed candidate target box, a box selection operation performed by the user on the operation button, and generating a box selection instruction based on the box selection operation to generate a tracking target box, where the box selection instruction is used to determine that at least one of the candidate target boxes is a tracking target box; and tracking, based on the tracking target box, the predetermined target corresponding to the tracking target box.

In some exemplary embodiments, the processor(s) of the target tracking system is configured to perform the following step, including: the displaying, based on the trigger operation, of the candidate target box in the current frame of picture displayed on the display interface to correspond to the feature portion of the predetermined target includes: displaying, based on the trigger operation, the candidate target box in the current frame of picture displayed on the display interface, where the candidate target box encloses the feature portion of the predetermined target.

In some exemplary embodiments, the target tracking system further includes an input apparatus (not shown), where the input apparatus may be an apparatus for the user to input an instruction, and may include one or more of an operation button, a keyboard, a mouse, a microphone, and a touchscreen. In addition, the input apparatus may also be any interface for receiving information.

In some exemplary embodiments, the target tracking system further includes an output apparatus, where the output apparatus may output various information (such as images or sounds) to the outside (such as the user), and may include one or more of a display (for example, displaying a point cloud to the user), a speaker, and the like. In addition, the output apparatus may also be any other device with an output function.

In some exemplary embodiments, the target tracking system further includes a communications interface, where the communications interface is used for communication between the target tracking system 400 and other devices, including wired or wireless communication. The target tracking system 400 may access a wireless network based on a communications standard, for example, Wi-Fi, 2G, 3G, 4G, 5G, or a combination thereof. In an exemplary embodiment, the communications interface further includes a near field communication (NFC) module to facilitate short range communication. For example, the NFC module may be implemented based on a radio frequency identification (RFID) technology, an Infrared Data Association (IrDA) technology, an ultra-wideband (UWB) technology, a Bluetooth (BT) technology, and other technologies.

Exemplarily, the target tracking system 400 in some exemplary embodiments of the present disclosure may also be implemented as a terminal such as a desktop computer, a tablet computer, or a notebook computer, or a mobile platform including these terminals.

In addition, some exemplary embodiments of the present disclosure further provide a computer storage medium, where the computer storage medium stores a computer program. The computer-readable storage medium may store one or more computer program instructions. A processor(s) may execute the program instruction stored in the storage device, to implement the functions (implemented by the processor) in some exemplary embodiments of the present disclosure in this disclosure and/or other expected functions, for example, to perform corresponding steps of the target tracking method 200 according to some exemplary embodiments of the present disclosure. For descriptions about the corresponding steps, reference may be made to the above descriptions. Details will not be described again herein. The computer-readable storage medium may further store various application programs and various data, for example, various data used and/or generated by the application program.

For example, the computer storage medium may include, for example, a storage card of a smartphone, a storage component of a tablet computer, a hard disk of a personal computer, a read-only memory (ROM), an erasable programmable read-only memory (EPROM), a portable compact disc read-only memory (CD-ROM), a USB memory, or any combination of the foregoing storage media. The computer-readable storage medium may be one or any combination of a plurality of computer-readable storage media.

Hereinafter, a mobile platform 500 of the present disclosure will be described with reference to FIG. 6.

Figure 6:
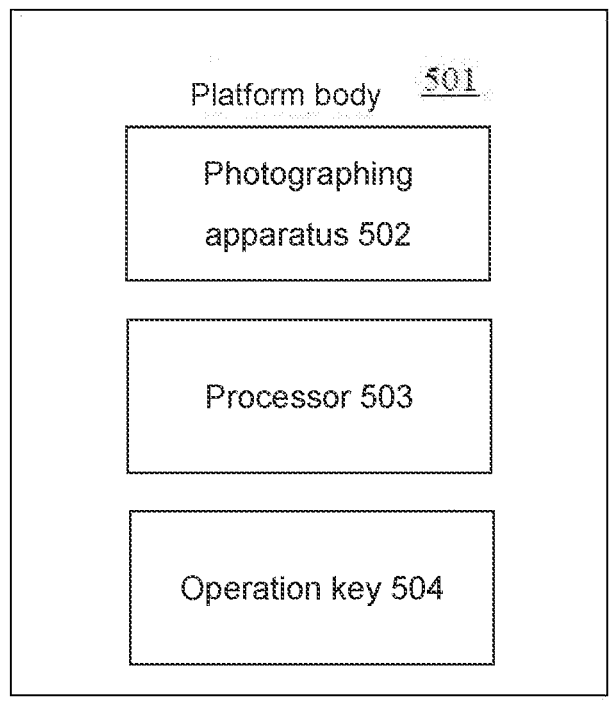
FIG. 6 is a schematic block diagram of a mobile platform according to some exemplary embodiments of the present disclosure.

As shown in FIG. 6, the mobile platform 500 in some exemplary embodiments of the present disclosure includes a platform body 501 for mounting a photographing apparatus 502.

The mobile platform having the photographing apparatus can shoot pictures of an external environment, objects, and scenes to collect pictures or video information, or the like. In some exemplary embodiments, the mobile platform includes at least one of a gimbal, an unmanned aerial vehicle, a vehicle, a robot, and a boat. In some exemplary embodiments, the mobile platform mainly includes a gimbal, and in particular, a handheld gimbal. When the photographing apparatus is mounted on the gimbal, the platform body is a gimbal body. When the photographing apparatus is applied to an unmanned aerial vehicle, the platform body is a body of the unmanned aerial vehicle. When the photographing apparatus is applied to a vehicle, the platform body is a body of the vehicle. The vehicle may be an autonomous vehicle or a semi-autonomous vehicle, and is not limited herein. When the photographing apparatus is applied to a remotely controlled vehicle, the platform body is a body of the remotely controlled vehicle. When the photographing apparatus is applied to a robot, the platform body is the robot.

The gimbal may be a supporting device for mounting and fixing the photographing apparatus. The gimbal in some exemplary embodiments of the present disclosure may be a handheld gimbal, and the gimbal may also be disposed on the mobile platform, such as an unmanned aerial vehicle or a vehicle.

In some exemplary embodiments of the present disclosure, the gimbal includes at least one rotary shaft mechanism (not shown), and the rotary shaft mechanism may include a motor (for example, a brushless motor or a brushed motor) and a shaft arm. For example, the rotary shaft mechanism may include a pitch mechanism, a roll mechanism, and a yaw axis mechanism. The plurality of rotary shaft mechanisms may be connected in series. The pitch mechanism may include a pitch axis motor and a pitch axis arm, the roll mechanism may include a roll axis motor and a roll axis arm, and the yaw axis mechanism may include a yaw axis motor and a yaw axis arm.

In some exemplary embodiments, the platform body of the gimbal may further include a base. When the gimbal is a handheld gimbal, the base may move with the movement of a user's hand. When the gimbal is connected to another mobile platform, the base may be rigidly connected to the mobile platform and move with the movement of the mobile platform.

In some exemplary embodiments, the gimbal may further include an inertial measurement unit (IMU). The IMU has no movement relative to the photographing apparatus and may be configured to measure a posture of the camera. For example, the IMU may be rigidly fixed to a fixing mechanism of the camera. In some exemplary embodiments, an IMU (not shown) may also be disposed on the base of the gimbal, and the IMU has no movement relative to the base. For example, the IMU may be rigidly fixed to the base.

The platform body 501 is equipped with the photographing apparatus 502. When the photographing apparatus 502 is mounted on the gimbal for photographing, sometimes the photographing apparatus 502 needs to photograph a slow-moving target, but sometimes needs to suddenly accelerate in order to photograph a fast-moving target.

In the case where the gimbal is a handheld gimbal, when photographing a moving target, the user may rotate the gimbal, that is, rotate the base of the gimbal and a controller can be used to control the rotary shaft mechanism of the gimbal, so that a target posture of the photographing apparatus 502 matches a posture of the base. When the gimbal is a handheld gimbal, a handheld stick or a handheld ring may be connected to the base, and the user can control movement of the gimbal by using the handheld stick or the handheld ring.

Further, the mobile platform 500 further includes at least one operation button 504, disposed on the platform body 501. In some exemplary embodiments, the operation button 504 includes at least one of a joystick and a button. A trigger operation includes at least one of the following: the user presses the joystick, or the user double-taps the button.

In some exemplary embodiments, the joystick may further control movement of the rotary shaft mechanism, for example, by operating the joystick to implement rotation of the rotary shaft mechanism of the handheld gimbal in a corresponding direction.

The mobile platform 500 further includes one or more processors 503. The processor 503 may be a central processing unit (CPU), a graphics processing unit (GPU), an application-specific integrated circuit (ASIC), a field-programmable gate array (FPGA), or a processing unit that is in another form and capable of data processing and/or instruction execution. The processor 503 may be a central processing unit (CPU), or a processing unit that is in another form and capable of data processing and/or instruction execution and capable of controlling other components in the mobile platform 500 to implement expected functions. For example, the processor 503 can include one or more embedded processors, a processor core, a microprocessor, a logic circuit, a hardware finite state machine (FSM), a digital signal processor (DSP), or a combination thereof.

In some exemplary embodiments, the processor 503 is configured to perform related steps in the target tracking method 200 in the foregoing embodiment, including: obtaining a user's trigger operation on an operation button, and generating a trigger instruction based on the trigger operation to generate at least one candidate target box, where the trigger instruction is used to operate a predetermined box selection mode, the predetermined box selection mode is used to generate the candidate target box in a predetermined recognition area, and the candidate target box corresponds to a feature portion of a predetermined target; displaying, based on the trigger operation, the candidate target box in a current frame of picture displayed on a display interface to correspond to the feature portion of the predetermined target, where the feature portion includes at least one portion of a body of the target, or the feature portion includes a posture of a body part of the target, and at least one portion of the body includes at least one of the following: a face, a head, shoulder(s), and a torso; then obtaining, based on the candidate target box, a box selection operation performed by the user on the operation button, and generating a box selection instruction based on the box selection operation to generate a tracking target box, where the box selection instruction is used to determine that at least one of the candidate target boxes is a tracking target box; and tracking the target based on the tracking target box.

In some exemplary embodiments, the predetermined box selection mode includes a first box selection mode and/or a second box selection mode, where the predetermined recognition area in the first box selection mode is a display interface; and the predetermined recognition area in the second box selection mode is a partial area of a display interface corresponding to a first default target box, and the first default target box is used to track a target in the first default target box by default before the tracking target box is generated.

In some exemplary embodiments, the trigger operation includes a first trigger operation and/or a second trigger operation, where the first trigger operation is used to generate a first trigger instruction, and the first trigger instruction is used to operate the first box selection mode; and the second trigger operation is used to generate a second trigger instruction, and the second trigger instruction is used to run the second box selection mode.

In some exemplary embodiments, the displaying, based on the trigger operation, of the candidate target box in the current frame of picture displayed on the display interface specifically includes: operating the predetermined box selection mode based on the trigger instruction; and generating the candidate target box in the predetermined recognition area based on the predetermined box selection mode that is in operation, where the candidate target box corresponds to the feature portion of the predetermined target.

In some exemplary embodiments, the generating of the candidate target box in the predetermined recognition area based on the predetermined box selection mode that is in operation specifically includes: generating, based on the predetermined box selection mode that is in operation, the candidate target box in the predetermined recognition area corresponding to the predetermined box selection mode.

In some exemplary embodiments, the displaying, based on the trigger operation, of the candidate target box in the current frame of picture displayed on the display interface includes: obtaining position information of the candidate target box; and displaying, based on the position information, the candidate target box in the current frame of picture displayed on the display interface. In some exemplary embodiments, the position information includes at least one of coordinates of a central point of the candidate target box and size information of the candidate target box. The candidate target box includes a rectangular box, and the size information includes a width and a height of the candidate target box.

In some exemplary embodiments, the generating of the candidate target box in the predetermined recognition area based on the predetermined box selection mode that is in operation includes: obtaining the feature portion of the target in the recognition area in the current frame of picture displayed on the display interface, where the obtaining of the feature portion of the target in the recognition area in the current frame of picture displayed on the display interface specifically includes: detecting and recognizing, based on a trained deep learning model, the feature portion of the target in the recognition area in the current frame of picture displayed on the display interface; and generating the candidate target box in the predetermined recognition area based on the feature portion.

In some exemplary embodiments, when operating the first box selection mode, the processor(s) of the mobile platform is configured to perform the following steps, including: sorting all the candidate target boxes based on central positions of the candidate target boxes; obtaining a selection operation performed by the user on the operation button to generate an indicated direction, where the indicated direction includes at least one of the following: up, down, left, and right; switching from the currently selected candidate target box to a predetermined selected candidate target box based on the indicated direction; and selecting at least one of the candidate target boxes as a tracking target box based on the box selection operation performed by the user on the operation button.

In an embodiment, when operating the first box selection mode, the processor(s) of the mobile platform is configured to perform the following step, including: in the current frame of picture displayed on the display interface, setting the candidate target box closest to a center of the current frame of picture as a second default target box, where the second default target box is used to track a target in the second default target box by default before the tracking target box is generated.

In some exemplary embodiments, when operating the second box selection mode, the processor(s) of the mobile platform is configured to perform the following steps, including: obtaining a feature portion of the target in the first default target box in the current frame of picture displayed on the display interface, where the first default target box is located in a center area of a lens of a photographing apparatus that shoots the current frame of picture; and adjusting the first default target box to the candidate target box based on the feature portion.

In some exemplary embodiments, when the second box selection mode is in operation, and the feature portion of the target is not detected in the recognition area, the first default target box remains unchanged.

In some exemplary embodiments, the mobile platform may be a mobile platform equipped with the photographing apparatus, and the photographing apparatus may be a built-in device of the mobile platform itself. The operation button is disposed on the mobile platform to facilitate user operations. The mobile platform includes at least one of the following: a gimbal, an unmanned aerial vehicle, a vehicle, a robot, and a boat.

In some exemplary embodiments, the tracking of the target based on the tracking target box includes: aligning the mobile platform based on the tracking target box with the target corresponding to the tracking target box, and synchronously moving with the target to track the target.

In this disclosure, the predetermined target is at least one target, and the candidate target box corresponds to the a feature portion of the predetermined target. The predetermined target is at least one target, where each candidate target box corresponds to a feature portion of each predetermined target; or each candidate target box corresponds to a feature portion of at least one predetermined target.

In some exemplary embodiments, the processor(s) of the mobile platform is configured to perform the following steps, including: obtaining, based on the displayed candidate target box, a box selection operation performed by the user on the operation button, and generating a box selection instruction based on the box selection operation to generate a tracking target box, where the box selection instruction is used to determine that at least one of the candidate target boxes is a tracking target box; and tracking, based on the tracking target box, the predetermined target corresponding to the tracking target box.

In some exemplary embodiments, the processor(s) of the mobile platform is configured to perform the following step, including: the displaying, based on the trigger operation, of the candidate target box in the current frame of picture displayed on the display interface to correspond to the feature portion of the predetermined target includes: displaying, based on the trigger operation, the candidate target box in the current frame of picture displayed on the display interface, where the candidate target box encloses the feature portion of the predetermined target.

In summary, the target tracking system, computer-readable storage medium, and mobile platform in some exemplary embodiments of the present disclosure can implement the target tracking method described in the above embodiments, thus they also have advantages of the method, including: the user does not need to manually draw a box, for example, on a display interface of a screen, but only needs to select at least one generated candidate target box as a tracking target box. For the user, this not only is convenient and labor-saving, but also can provide a high-quality candidate target box for target tracking, thereby improving a target tracking effect. Moreover, when the user selects at least one candidate target box as a tracking target box, the user's hand does not need to leave a mobile platform such as a gimbal to perform an operation on the display interface, and the user only needs to control the operation button to perform a box selection operation. In this way, the user can still hold the mobile platform such as the gimbal with both hands. Therefore, it is more labor-saving and more convenient.

Although some exemplary embodiments have been described herein with reference to the accompanying drawings, it should be understood that the exemplary embodiments are merely exemplary, and are not intended to limit the scope of the present disclosure thereto. A person of ordinary skill in the art can make various changes and modifications without departing from the scope and principles of the present disclosure. All the changes and modifications are intended to be included in the scope of the present disclosure as claimed in the appended claims.

A person of ordinary skill in the art may be aware that the units and algorithm steps in the examples described with reference to the embodiments disclosed in this disclosure can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

In the embodiments provided in the present disclosure, it should be understood that the disclosed device and method may be implemented in other manners. For example, the described device embodiment is merely exemplary. For example, the unit division is merely logical functional division and there may be other division manners in an actual implementation. For example, a plurality of units or components may be combined or integrated into another device, or some features may be ignored or may not be performed.

Although plenty of details are described in the disclosure provided herein, it can be understood that the embodiments of the present disclosure can be practiced without these specific details. In some examples, well-known methods, structures, and technologies are not shown in detail to avoid affecting understanding of this disclosure.

Similarly, it should be understood that, to simplify the present disclosure and help understand one or more of various aspects of the present disclosure, in the description of the exemplary embodiments of the present disclosure, various features of the present disclosure are sometimes grouped together into a single embodiment, figure, or description thereof. However, the method of the present disclosure should not be construed as reflecting an intention that the claimed disclosure requires more features than the features expressly described in each claim. More specifically, as reflected in the corresponding claims, the point of the disclosure lies in that corresponding technical problems can be resolved by using features fewer than all features of a single disclosed embodiment. Therefore, the claims following a specific implementation are thus explicitly incorporated into the specific implementation, and each claim itself serves as a separate embodiment of the present disclosure.

A person skilled in the art can understand that, without mutual exclusion between the features, any combination may be used to combine all features disclosed in this disclosure (including the accompanying claims, abstract, and drawings) and all processes or units of any method or device disclosed in this manner. Unless otherwise expressly described, each feature disclosed in this disclosure (including the accompanying claims, abstract and drawings) may be replaced by an alternative feature serving the same, equivalent or similar purpose.

In addition, a person skilled in the art can understand that although some exemplary embodiments described herein include certain features (not other features) included in other embodiments, a combination of features of different embodiments means that the features are within the scope of the present disclosure and form different embodiments. For example, in the claims, any one of the claimed embodiments may be used in any combination.

Various embodiments of the present disclosure may be implemented by hardware, or implemented by software modules running on one or more processors, or implemented by a combination thereof. A person skilled in the art should understand that, in practice, a microprocessor or a digital signal processor (DSP) may be used to implement some or all functions of some modules according to some exemplary embodiments of the present disclosure. The present disclosure may be further implemented as an apparatus program (for example, a computer program and a computer program product) configured to perform a part or an entirety of the method described herein. The program for implementing the present disclosure may be stored in a computer-readable medium, or may have one or a plurality of signal forms. Such signals may be downloaded from an Internet site, or provided on carrier signals, or provided in any other form.

It should be noted that the above embodiments illustrate rather than limit the present disclosure and that a person skilled in the art can design alternative embodiments without departing from the scope of the appended claims. Any reference sign placed between parentheses in a claim shall not be construed as a limitation on the claim. The present disclosure can be implemented by hardware including several different elements, and by a suitably programmed computer. In unit claims enumerating several apparatuses, several of these apparatuses may be specifically embodied by a same hardware item. Use of the words "first", "second", "third", and the like does not represent any sequence. These terms may be interpreted as names.

What is claimed is:

1. A target tracking method, comprising:
obtaining, by a target tracking system, a trigger operation on an operation button to generate a trigger instruction, wherein the trigger instruction enables the target tracking system to operate in a predetermined box selection mode;
generating, by the target tracking system based on the trigger instruction, at least one candidate target box under the box selection mode;

displaying, by the target tracking system, the at least one candidate target box on a predetermined recognition area of a display interface, wherein the display interface is displaying a target in a current frame of picture, and each of the at least one candidate target box corresponds to a feature portion of the target;

obtaining, based on the at least one candidate target box, a box selection operation on the operation button;

generating, based on the box selection operation, a box selection instruction;

generating, based on the box selection instruction, a tracking target box among the at least one candidate target box; and tracking the target with the tracking target box.

2. The method according to claim 1, wherein
the box selection mode includes at least one of a first box selection mode, or a second box selection mode;
in the first box selection mode, the recognition area is the display interface itself;
in the second box selection mode, the recognition area is a partial area of the display interface corresponding to a first default target box; and
the first default target box is by default configured to track a target in the first default target box prior to the generating of the tracking target box.

3. The method according to claim 2, wherein
the trigger operation includes at least one of a first trigger operation or a second trigger operation;
the first trigger operation renders the target tracking system to generate a first trigger instruction to operate in the first box selection mode; and
the second trigger operation renders the target tracking system to generate a second trigger instruction to operate in the second box selection mode.

4. The method according to claim 1, wherein
the displaying of the at least one candidate target box includes:
operating the box selection mode based on the trigger instruction; and
generating the at least one candidate target box in the recognition area based on the box selection mode.

5. The method according to claim 1, wherein
the displaying of the at least one candidate target box includes:
obtaining position information of the at least one candidate target box; and
displaying, based on the position information, the at least one candidate target box in the current frame of picture displayed on the display interface.

6. The method according to claim 2, further comprising, in the first selection mode:
sorting all of the at least one candidate target box based on central positions of the at least one candidate target box;
obtaining a direction selection operation on the operation button to generate an indicated direction;
switching from a currently selected candidate target box to a directed candidate target box based on the indicated direction; and
selecting the tracking target box based on the directed candidate target box.

7. The method according to claim 2, further comprising, in the first box selection mode:
setting, in the frame of picture displayed on the display interface, a candidate target box that is closest to a center of the current frame of picture among the at least one candidate target box as a second default target box, wherein
the second default target box by default is configured to track a target in the second default target box by default prior to the generating of the tracking target box.

8. The method according to claim 2, wherein
the first default target box is located in a center area of a lens of a photographing apparatus that shoots the frame of picture.

9. The method according to claim 2, further comprising:
operating the second box selection mode;
obtaining a first feature portion of the target in the first default target box in the current frame of picture displayed on the display interface; and
adjusting the first default target box to become one of the at least one candidate target box based on the first feature portion.

10. The method according to claim 2, further comprising:
operating the second box selection mode; and
maintaining the first default target box upon detecting the portion of the target not presenting in the recognition area.

11. The method according to claim 1, wherein
the operation button includes at least one of a joystick, or a button.

12. The method according to claim 1, wherein
the feature portion includes at least one of a portion of the target, or a posture of the target.

13. The method according to claim 12, wherein, the portion of the target includes at least one of a face, a head, a shoulder, or a torso.

14. The method according to claim 1, wherein
the photographing apparatus and the operation button are disposed on a mobile platform.

15. The method according to claim 14, wherein
the mobile platform includes at least one of: a handheld gimbal, an unmanned aerial vehicle, a vehicle, a robot, or a boat.

16. The method according to claim 14, wherein the tracking of the target with the tracking target box includes:
aligning, based on the tracking target box the mobile platform with the target corresponding to the tracking target box to move synchronously with the target, so as to track the target.

17. The method according to claim 1, wherein
the target is at least one target, and the at least one candidate target box corresponds to the feature portion of the predetermined target.

18. The method according to claim 1, wherein
the displaying of the at least one candidate target box includes:
displaying, based on the trigger operation, the at least one candidate target box in the current frame of picture displayed on the display interface, wherein
the candidate target box encloses the feature portion of the target.

19. A target tracking system, comprising:
at least one storage medium storing a set of instructions for target tracking; and
at least one processor in communication with the at least one storage medium, wherein during operation, the at least one processor executes the set of instructions to:
obtain, by a target tracking system, a trigger operation on an operation button to generate a trigger instruction, wherein the trigger instruction enables the target tracking system to operate in a predetermined box selection mode;

generate, by the target tracking system based on the trigger instruction, at least one candidate target box under the box selection mode;

display, by the target tracking system, the at least one candidate target box on a predetermined recognition area of a display interface, wherein the display interface is displaying a target in a current frame of picture, and each of the at least one candidate target box corresponds to a feature portion of the target;

obtain, based on the at least one candidate target box, a box selection operation on the operation button;

generate, based on the box selection operation, a box selection instruction;

generate, based on the box selection instruction, a tracking target box among the at least one candidate target box; and track the target with the tracking target box.

20. A mobile platform, comprising:
a platform body;
at least one operation button, disposed on the platform body;
at least one storage medium storing a set of instructions for target tracking; and
at least one processor in communication with the at least one storage medium, wherein during operation, the at least one processor executes the set of instructions to:
obtain, by a target tracking system, a trigger operation on an operation button to generate a trigger instruction, wherein the trigger instruction enables the target tracking system to operate in a predetermined box selection mode;

generate, by the target tracking system based on the trigger instruction, at least one candidate target box under the box selection mode;

display, by the target tracking system, the at least one candidate target box on a predetermined recognition area of a display interface, wherein the display interface is displaying a target in a current frame of picture, and each of the at least one candidate target box corresponds to a feature portion of the target;

obtain, based on the at least one candidate target box, a box selection operation on the operation button;

generate, based on the box selection operation, a box selection instruction;

generate, based on the box selection instruction, a tracking target box among the at least one candidate target box; and track the target with the tracking target box.

* * * * *